(12) United States Patent
Davidson et al.

(10) Patent No.: US 9,381,591 B2
(45) Date of Patent: *Jul. 5, 2016

(54) SYSTEMS AND METHODS FOR DIAGNOSING SECONDARY WELD ERRORS

(71) Applicant: ILLINOIS TOOL WORKS INC., Glenview, IL (US)

(72) Inventors: Robert Raimund Davidson, New London, WI (US); Richard J. Schuh, Freedom, WI (US); Anthony Joseph Kowaleski, Manawa, WI (US); Thomas Allen Bunker, DePere, WI (US); Nicholas James Dessart, Appleton, WI (US); Bruce A. Casner, Neenah, WI (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 14/824,866

(22) Filed: Aug. 12, 2015

(65) Prior Publication Data

US 2015/0343551 A1  Dec. 3, 2015

Related U.S. Application Data

(60) Continuation of application No. 14/589,716, filed on Jan. 5, 2015, now Pat. No. 9,108,264, which is a division of application No. 14/064,946, filed on Oct. 28, 2013, now Pat. No. 8,927,902, which is a division (Continued)

(51) Int. Cl.
*B23K 9/10* (2006.01)
*B23K 9/095* (2006.01)
(Continued)

(52) U.S. Cl.
CPC .............. *B23K 9/0953* (2013.01); *B23K 9/0956* (2013.01); *B23K 9/10* (2013.01); *B23K 9/1006* (2013.01); *B23K 9/28* (2013.01); *B23K 9/323* (2013.01); *B23K 31/12* (2013.01)

(58) Field of Classification Search
CPC ...... B23K 9/0953; B23K 9/1006; B23K 9/10; B23K 9/28; B23K 9/323; B23K 9/0956; B23K 31/12
USPC ............... 219/130.1, 124.34, 130.51, 130.21, 219/130.5, 137 PS, 137 R
See application file for complete search history.

(56) References Cited

U.S. PATENT DOCUMENTS

| 3,826,890 A | 7/1974 | Bartlett |
| 4,224,501 A | 9/1980 | Lindbom |

(Continued)

FOREIGN PATENT DOCUMENTS

| EP | 1920866 | 5/2008 |
| JP | 62127173 | 6/1987 |

(Continued)

OTHER PUBLICATIONS

Partial International Search Report for application No. PCT/US2010/038338 mailed Oct. 8, 2010.

*Primary Examiner* — Viet Q Nguyen
(74) *Attorney, Agent, or Firm* — Fletcher Yoder P.C.

(57) ABSTRACT

A controller for a welding system adapted to determine a value of a weld secondary parameter across a weld secondary component based on a sensed parameter is provided. The controller may also be adapted to compare the determined value to a reference value range and to alert a user to a presence and location of a weld secondary error when the determined value is outside the referenced value range.

21 Claims, 4 Drawing Sheets

Related U.S. Application Data of application No. 13/747,150, filed on Jan. 22, 2013, now Pat. No. 8,592,721, which is a division of application No. 12/813,316, filed on Jun. 10, 2010, now Pat. No. 8,367,972.

(60) Provisional application No. 61/186,175, filed on Jun. 11, 2009.

(51) Int. Cl.
*B23K 9/28* (2006.01)
*B23K 9/32* (2006.01)
*B23K 31/12* (2006.01)

(56) References Cited

U.S. PATENT DOCUMENTS

| | | | |
|---|---|---|---|
| 4,317,980 A | 3/1982 | Goodrich | |
| 4,446,354 A | 5/1984 | Kearney | |
| 4,477,713 A | 10/1984 | Cook | |
| 4,551,668 A | 11/1985 | Kammiller | |
| 4,585,921 A | 4/1986 | Wilkins | |
| 4,595,820 A | 6/1986 | Richardson | |
| 4,596,917 A | 6/1986 | Nied | |
| 4,721,947 A * | 1/1988 | Brown | B23K 9/0956 228/103 |
| 4,947,021 A | 8/1990 | Stava | |
| 5,121,339 A | 6/1992 | Jenuwine | |
| 5,436,427 A | 7/1995 | Bourque | |
| 5,651,903 A | 7/1997 | Shirk | |
| 5,714,734 A | 2/1998 | Peterson | |
| 5,850,066 A | 12/1998 | Dew | |
| 6,013,891 A | 1/2000 | Stempfer | |
| 6,066,832 A | 5/2000 | Uecker | |
| 6,172,888 B1 | 1/2001 | Jochi | |
| 6,329,635 B1 | 12/2001 | Leong | |
| 6,350,960 B1 | 2/2002 | Norris | |
| 6,359,258 B1 | 3/2002 | Blankenship | |
| 6,596,970 B2 | 7/2003 | Blankenship | |
| 6,624,388 B1 | 9/2003 | Blankenship | |
| 6,710,297 B1 | 3/2004 | Artelsmair | |
| 6,730,875 B2 | 5/2004 | Hsu | |
| 7,194,447 B2 | 3/2007 | Harvey | |
| 7,380,697 B2 * | 6/2008 | Seki | B23K 9/0953 228/102 |
| 7,448,272 B2 * | 11/2008 | Aznar | G01N 29/11 73/634 |
| 7,683,290 B2 | 3/2010 | Daniel | |
| 7,705,269 B2 | 4/2010 | Daniel | |
| 8,052,034 B2 | 11/2011 | Fleming | |
| 8,232,501 B2 | 7/2012 | Ohashi | |
| 8,367,972 B2 * | 2/2013 | Davidson | B23K 9/10 219/124.34 |
| 8,546,728 B2 | 10/2013 | Sickels | |
| 8,592,721 B2 * | 11/2013 | Davidson | B23K 9/10 219/124.34 |
| 8,742,280 B2 * | 6/2014 | Vogel | B23K 9/0953 219/130.31 |
| 8,847,100 B2 * | 9/2014 | Holcomb | B23K 11/252 219/109 |
| 8,927,902 B2 * | 1/2015 | Davidson | B23K 9/10 219/124.34 |
| 9,108,264 B2 * | 8/2015 | Davidson | B23K 9/10 |
| 2008/0314887 A1 | 12/2008 | Stoger | |
| 2012/0006800 A1 | 1/2012 | Ryan | |

FOREIGN PATENT DOCUMENTS

| | | |
|---|---|---|
| JP | 9216059 | 8/1997 |
| KR | 20030004532 | 1/2013 |

* cited by examiner

SYSTEMS AND METHODS FOR DIAGNOSING SECONDARY WELD ERRORS

CROSS REFERENCE TO RELATED APPLICATIONS

This application is a Continuation Application from U.S. patent application Ser. No. 14/589,716, entitled "Systems and Methods for Diagnosing Secondary Weld Errors", filed Jan. 5, 2015, which is a Divisional Patent Application from U.S. patent application Ser. No. 14/064,946, entitled "Systems and Methods for Diagnosing Secondary Weld Errors", filed Oct. 28, 2013, and issued as U.S. Pat. No. 8,927,902 on Jan. 6, 2015, which is a Divisional Patent Application from U.S. patent application Ser. No. 13/747,150, entitled "Systems and Methods for Diagnosing Secondary Weld Errors", filed Jan. 22, 2013, and issued as U.S. Pat. No. 8,592,721 on Nov. 26, 2013, which is a Divisional Patent Application from U.S. patent application Ser. No. 12/813,316, entitled "Systems and Methods for Diagnosing Secondary Weld Errors", filed Jun. 10, 2010, and issued as U.S. Pat. No. 8,367,972 on Feb. 5, 2013, which is a Non-Provisional Patent Application of U.S. Provisional Patent Application No. 61/186,175, entitled "Weld Secondary Diagnostics", filed Jun. 11, 2009, all of which are herein incorporated by reference.

BACKGROUND

The invention relates generally to welding systems, and, more particularly, to systems and methods for diagnosing an error in a weld secondary component of a welding system.

Welding is a process that has become ubiquitous in various industries and applications, such as construction, ship building, and so forth. Welding systems typically include a variety of secondary components, which may include secondary cabling as well as secondary equipment. Such secondary components may include welding torches, weld fixturing, weld cables, and so forth, the quality of which may impact the quality of the weld obtained in a welding operation. Unfortunately, the high current levels associated with typical welding processes often lead to degradation of the secondary cabling and/or equipment over time. For example, the number of operational strands of copper, or their integrity within a weld cable may be reduced over time by environmental factors and incidences, such as the weld cabling being run over by construction vehicles.

While a decrease in weld quality may be observed when the weld is impacted by such weld secondary issues, it is often difficult and time consuming to identify the root cause as the weld secondary issue. For instance, because copper strands are located within an insulation jacket of the weld cable, it may be difficult to readily identify weld cabling as the source of the observed decrease in weld quality. Furthermore, even when weld secondary equipment has been identified as the source of the poor weld quality, it may be difficult to determine which secondary weld component is the underlying source. Accordingly, there exists a need for improved systems and methods for the identification and location of weld secondary issues.

BRIEF DESCRIPTION

In an exemplary embodiment, a controller for a welding system is adapted to determine one or more of a weld cabling parameter, a weld torch parameter, a rotary ground parameter, a fixturing parameter, and a workpiece parameter and to compare, depending upon the parameter determined, one or more of the weld cabling parameter to a first reference value, the weld torch parameter to a second reference value, the rotary ground parameter to a third reference value, the fixturing parameter to a fourth reference value, and the workpiece parameter to a fifth reference value. The controller is also adapted to determine, depending upon the parameter determined, whether there is a difference between one or more of the weld cabling parameter and the first reference value, the weld torch parameter and the second reference value, the rotary ground parameter and the third reference value, the fixturing parameter and the fourth reference value, and the workpiece parameter and the fifth reference value. The controller is also adapted to alert an operator to a presence and location of a weld secondary error when there is a determined difference between at least one of the weld cabling parameter and the first reference value, the weld torch parameter and the second reference value, the rotary ground parameter and the third reference value, the fixturing parameter and the fourth reference value, or the workpiece parameter and the fifth reference value.

In another embodiment, a controller for a welding system is adapted to receive an initial sensed parameter while a welding torch tip is shorted to a weld secondary component, determine, based on the initial sensed parameter, an initial value of the initial sensed parameter of the weld secondary component, time stamp the determined initial value of the sensed parameter, and store the time stamped determined initial value of the sensed parameter to a memory. The controller is also adapted to receive a second sensed parameter while the welding torch tip is shorted to the weld secondary component and determine, time stamp, and store a second value of the second sensed parameter of the weld secondary component. The controller is also adapted to compare the time stamped determined initial value of the initial sensed parameter to the time stamped determined second value of the second sensed parameter, and to alert a user to a presence and location of a weld secondary component error when there is a difference between the initial value of the initial sensed parameter and the second value of the second sensed parameter.

In another embodiment, a controller for a welding system is adapted to determine a value in a weld secondary parameter across a weld secondary component based on a sensed parameter, to compare the determined value to a reference value range, and to alert a user to a presence and location of a weld secondary error when the determined value is outside the referenced value range.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As described in detail below, embodiments are provided of systems and methods that may be utilized to identify the existence of an error associated with secondary weld cabling and/or equipment. Such systems and methods may also provide the ability to identify a location of the secondary weld error and to communicate such a location to a welding operator. That is, embodiments of the present invention may provide for both detection of errors in weld secondary cables/equipment and the identification of the cause and/or location of such errors. In some embodiments, a weld controller may be provided such that the acquired measurements and error information may be communicated to the welding operator. For example, in such embodiments, the operator may input information regarding the length and size of weld cabling, a welding torch manufacturer, a welding torch model number, and so forth, which may be utilized by the weld controller to determine whether the acquired measurements are within an acceptable range for the given welding equipment. Still further, in some embodiments, the weld controller may be configured to track changes in one or more measured voltage drops associated with secondary weld cabling/equipment over time and alert the operator to changes that may represent degradation of one or more weld components.

Figure 1:
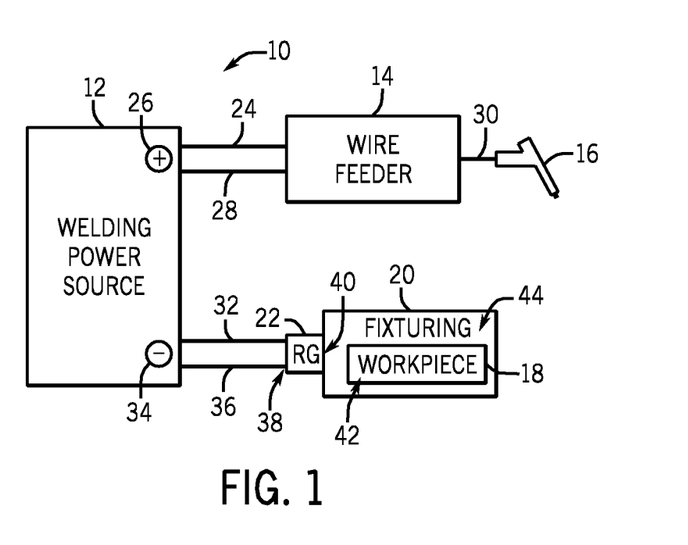
FIG. 1 is a schematic illustrating an exemplary welding system in accordance with embodiments of the present invention.

Turning now to the drawings, FIG. 1 illustrates a welding system 10 including a welding power source 12, a wire feeder 14, a welding torch 16, and a workpiece 18 positioned on fixturing 20 with rotary ground 22. In the illustrated embodiment, a positive weld lead 24 couples a positive terminal 26 of the welding power source 12 to the wire feeder 14. A positive sense lead 28 is disposed between the welding power source 12 and the wire feeder 14. A cable 30 couples the wire feeder to the welding torch 16. Similarly, a negative weld lead 32 couples a negative terminal 34 of the welding power source 12 to the rotary ground 22, and a negative sense lead 36 is disposed between the welding power source 12 and the rotary ground 22.

During operation, the welding power source 12 is configured to provide power to the welding torch 16 through the wire feeder 14, which provides wire for the welding operation. Further, during use, a welding operator utilizes the welding torch 16 to weld the workpiece 18. While welding, high current levels associated with the welding process may degrade the secondary cabling/equipment, and after many welding cycles, degradation of the secondary cabling/equipment may impact the quality of the weld. As such, embodiments of the present invention provide for testing including shorting of the welding torch 16 at a variety of predetermined locations and sensing of voltage during such shorting. Such sensed voltages may be utilized by a weld controller to determine a variety of desired voltage drops levels. The voltage drop levels may be subsequently communicated to the welding operator for identification of one or more secondary weld errors and the associated locations of such errors, as described in detail below.

For example, the torch 16 may be shorted to a first location 38 located at a connection between the negative weld lead 36 and the rotary ground 22. The torch 16 may also be shorted at a second location 40 located at the fixturing side of the rotary ground 22. Still further, the torch 16 may be shorted at a third location 42 located on the workpiece and a fourth location 44 located on the fixturing. It should be noted that in additional embodiments, the torch 16 may be shorted at additional locations, such as at any suitable location on the workpiece 18 and any suitable location on the fixturing 20. Indeed, in some embodiments, the torch 16 may be shorted at multiple locations on the workpiece 18 and/or the fixturing 20. The voltages sensed during such shorts may be utilized by a controller to determine and/or communicate one or more weld secondary errors and the locations of such errors to the welding operator.

Figure 2:
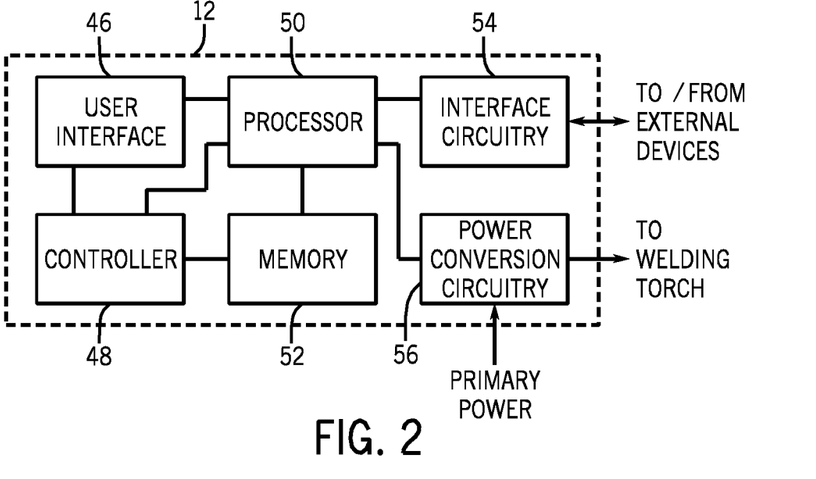
FIG. 2 is a block diagram illustrating exemplary components of the welding power source of FIG. 1 in accordance with embodiments of the present invention.

FIG. 2 illustrates exemplary components of the welding power source 12 of FIG. 1. In the illustrated embodiment, the welding power source 12 includes a user interface 46, a controller 48, a processor 50, memory 52, interface circuitry 54, and power conversion circuitry 56. During use, the power conversion circuitry 56 is configured to receive primary power from a primary source, such as a wall outlet, a power grid, and so forth, and to convert such power to an appropriate welding output for transfer to the welding torch 16. The processor 50 is configured to receive a variety of inputs regarding wire feeder operation, user choices, voltage feedback, current feedback, power feedback, resistance feedback, inductance feedback, and so forth, to process such inputs, and to generate a variety of suitable outputs that guide operation of the welding power source 12. For example, the interface circuitry 54 may receive feedback from one or more external devices (e.g., wire feeder 14, auxiliary devices, etc.), communicate such feedback to the processor 50, receive an output signal from the processor 50, and communicate such a signal to the one or more external devices.

Still further, the processor 50 may receive user inputs from the user interface 46 regarding the welding operation. For example, the processor 50 may receive commands regarding the chosen welding process, parameters of the welding process (e.g., current level, voltage level, etc.), and so forth and process such inputs. The processor 50 may also receive one or more inputs from the controller 48, which may be configured to execute one or more algorithms utilized to guide the welding process and/or any other functions of the welding power source 12. For example, in one embodiment, the controller 48 may execute a series of commands to determine the presence and location of one or more errors in the secondary weld cabling/equipment. Acquired measurement data may then be communicated to the processor via interface circuitry 54, which may process the received information to determine the occurrence of one or more secondary errors and their associated locations. Such information may be communicated to the user, for example, via user interface 46. To that end, user interface 46 may communicate the presence and/or location of the one or more detected weld secondary errors via visual cues (e.g., light illumination, display panel message, etc.), audio cues (e.g., error message recites error), or any other suitable communication mechanism.

Figure 3:
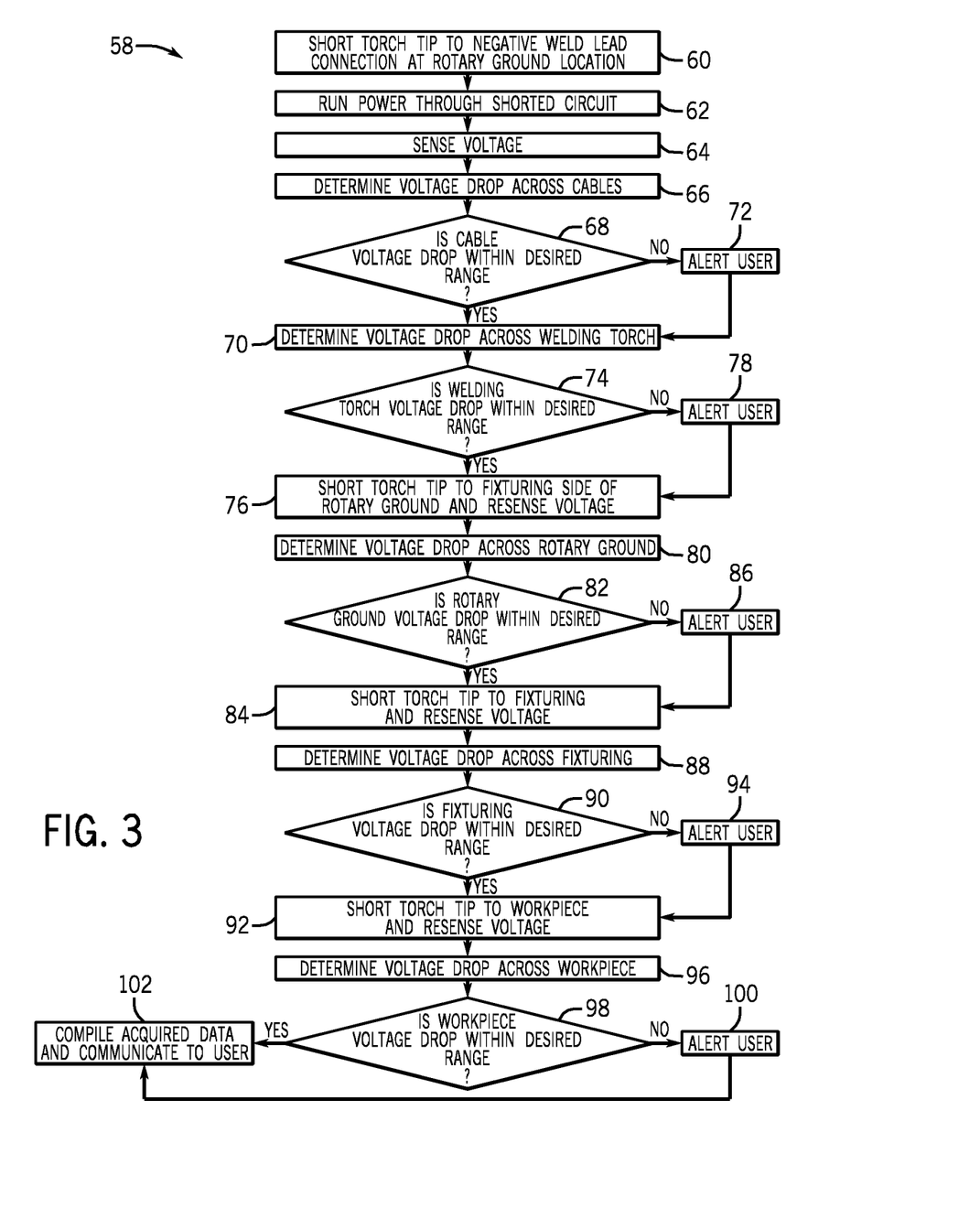
FIG. 3 is a flow chart illustrating an exemplary method that may be utilized by a weld controller to determine a presence and location of an error in a weld secondary component in accordance with embodiments of the present invention.

FIG. 3 is a flow chart 58 illustrating an exemplary method that may be utilized by the weld controller to determine the presence and location of an error in the weld secondary cabling and/or equipment. The method 58 includes short circuiting a tip of the torch to a negative weld lead connection at the rotary ground location (block 60), which is represented as the first location 38 in FIG. 1. Power may then be run through the shorted circuit (block 62), and the voltage may be sensed (block 64). Since the voltage at the studs of the welder may be sensed, and additional voltages may be sensed via the positive sense lead 28 and the negative sense lead 36, a voltage drop across the cables may be determined (block 66) via the following equation:

$$V\_Cable = V\_Stud - V\_Sense, \quad (1)$$

in which V_Cable is the sum of the positive and negative voltage drops of the cables, V_Stud is the voltage across the output of the welding power source, and V_Sense is the remotely sensed voltage.

The controller may then check if the calculated cable voltage drop, V_Cable, is within a desired range (block 68). That is, in some embodiments, the user may input parameters associated with the secondary weld equipment and cabling prior to welding, and such information may be utilized by the controller to determine an acceptable voltage drop range. Such input parameters may include but are not limited to the length and size of the negative weld lead cable, the length and size of the positive weld lead cable, the torch manufacturer, the torch model number, length of torch cable, and so forth. For further example, in one embodiment, determining if the cable voltage drop is within a desired range may include comparing the calculated V_Cable to a lookup table including a variety of suitable ranges based on a number of known input factors. Still further, a determination of whether the cable voltage drop is within a desired range may include comparing V_Cable to any suitable reference value, such as a reference voltage drop acquired when the welding components have been purchased but not yet used for welding, when the welding system is commissioned, when the quality of the weld is observed to be acceptable, and so forth.

If V_Cable is determined to be within the desired range, the controller may continue to determine a voltage drop (V_Torch) across the welding torch (block 70), which may be equal to approximately V_Sense. Alternatively, if V_Cable is not within the desired range, the controller may alert the user (block 72) as to the presence and location of the secondary error. After alerting the user, the controller may then determine the voltage drop across the welding torch (block 70) as before. The controller may inquire as to whether V_Torch is within a desired range (block 74), as determined by previously received inputs from the operator. If V_Torch is within the desired range, the torch tip may then be moved and shorted to the fixturing side of the rotary ground, as represented by the second location 40 in FIG. 1, and the voltage may be sensed (block 76) to obtain a V_Sense2 value. If V_torch is not within the desired range, the user may be alerted of the weld secondary error and location (block 78) before additional measurements are taken. In this way, a voltage drop across the rotary ground, V_RotaryGround may be determined (block 80) via the following equation:

$$V\_RotaryGround = V\_Sense2 - V\_Torch. \quad (2)$$

After determining V_RotaryGround, the controller may check whether V_RotaryGround is within the predetermined desired range for the given welding equipment (block 82). If V_RotaryGround is within the desired range, the torch tip may be shorted to the fixturing, as represented by the fourth location 44 in FIG. 1, and the voltage may again be sensed to obtain V_Sense3 (block 84). If V_RotaryGround is not within the desired range, the user may be alerted (block 86) before shorting the torch tip to the fixturing. The voltage drop across the fixturing, V_Fixturing, may then be determined (block 88) according to the following equation:

$$V\_Fixturing = V\_Sense3 - V\_Torch - V\_RotaryGround. \quad (3)$$

After determining V_Fixturing, the controller may check whether V_Fixturing is within the predetermined desired range for the given welding equipment (block 90). If V_Fixturing is within the desired range, the torch tip may be shorted to the workpiece, as represented by the third location 42 in FIG. 1, and the voltage may again be sensed to obtain V_Sense4 (block 92). If V_Fixturing is not within the desired range, the user may be alerted (block 94) before shorting the torch tip to the workpiece. The voltage drop across the workpiece, V_Workpiece, may then be determined (block 96) according to the following equation:

$$V\_Workpiece = V\_Sense4 - V\_Torch - V\_Rotary\text{-}Ground - V\_Fixturing. \quad (4)$$

The controller may then check if V_Workpiece is within a desired range as predetermined based on input parameters (block 98). If V_Workpiece is not within the desired range, the user is again alerted (block 100) and informed of the presence and location of the weld secondary error. Alternatively, if V_Workpiece is within the desired range, the controller compiles the acquired data and communicates such information to the user (block 102), for example, through user interface 46. As such, embodiments of the present invention may allow for both detection of a weld secondary error as well as determination of a location associated with the secondary weld error.

In the embodiments illustrated, one or more voltage drops are determined based on measured voltages. However, it should be noted that in further embodiments, a variety of parameters other than voltage may be employed as well. For instance, the measured parameter may include voltage, resistance, power, current, inductance, any other suitable parameter, or any combination of suitable parameters. Still further, the method 58 described in detail above may be subject to various modifications during implementation. For example, additional measurements not specifically referred to in method 58 may be acquired in some embodiments, while in still further embodiments, only some of the illustrated measurements may be acquired. For instance, the torch may be shorted to a variety of positions on the workpiece and/or the fixturing to determine the presence and location of a weld secondary error. Still further, the welding power source may be further configured to store the acquired data either at the end of the method 58 or each time a new measurement is acquired during implementation of the method 58.

Figure 4:
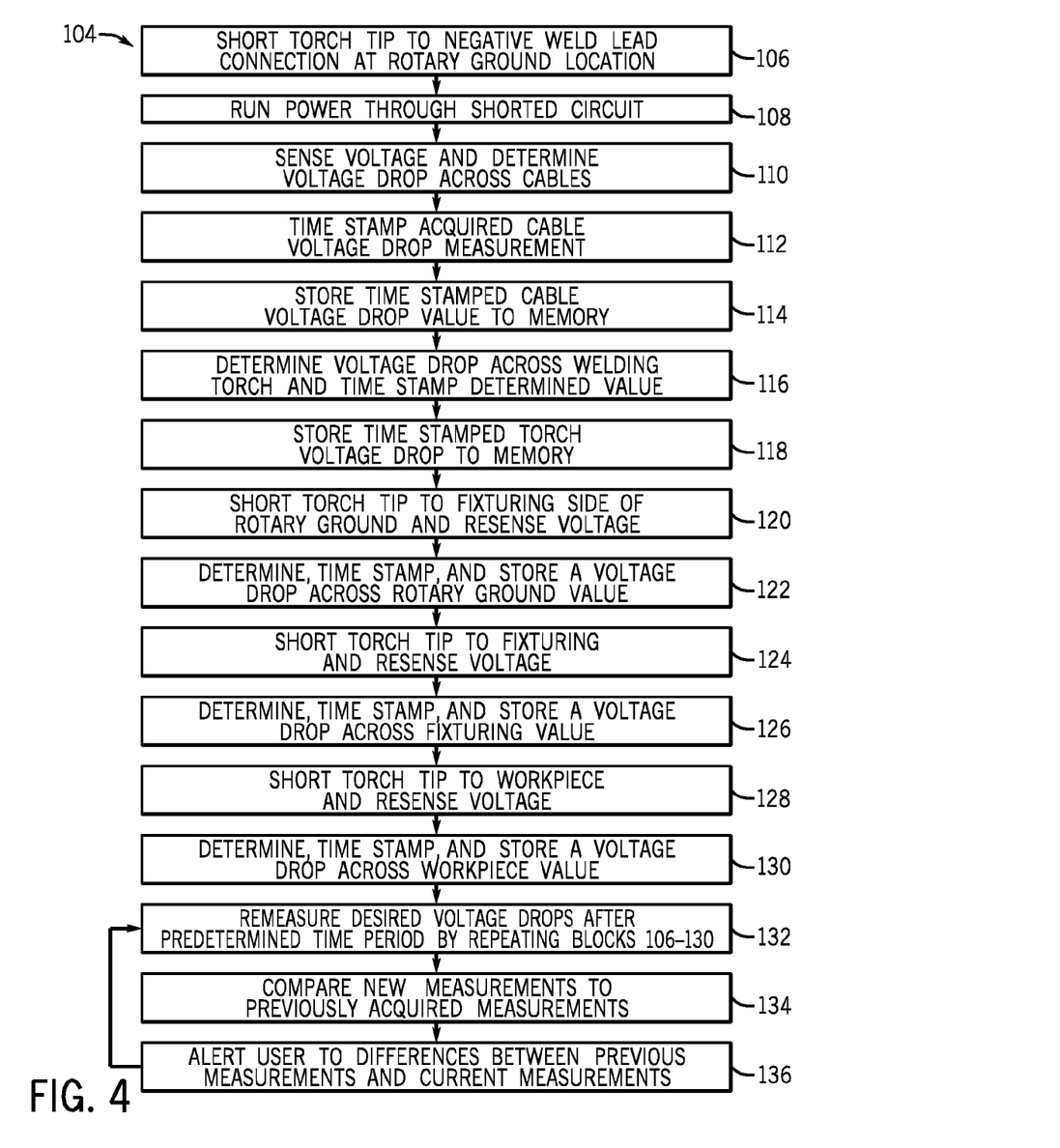
FIG. 4 illustrates an exemplary method of testing for one or more weld secondary errors via the acquisition of one or more suitable measurements, the time stamping of such measurements, and the logging of the acquired data in accordance with embodiments of the present invention.

FIG. 4 illustrates an exemplary method 104 of testing for one or more weld secondary errors via the acquisition of one or more suitable measurements, the time stamping of such measurements, and the subsequent logging of the acquired data. As such, the method 104 may be utilized to compare data from a first installation of welding equipment to data acquired after a predetermined use period, which may be defined by a preset period of time (e.g., monthly), a preset number of welds, or any other suitable use period. As such, one or more log tables may be stored in the system memory and periodically accessed to compare currently acquired measurements to previously acquired measurements. Any differences in such measurements may be indicative of a weld secondary error and, accordingly, may be communicated to the user via the user interface.

The method 104 begins with an initial series of measurements, which may typically be acquired at installation of the welding system or any other suitable reference point. As such, the method 104 includes shorting the torch tip to the negative weld lead connection to the rotary ground (block 106) and running power through the short circuit (block 108). The voltage may then be sensed and a voltage drop across the welding cables is determined (block 110). The acquired voltage drop in the welding cables is then time stamped (block 112) and stored to memory (block 114). As such, the first acquired welding cable voltage drop measurement may be later identified as a base point for comparison to later measurements. For example, if later welding cable voltage drop measurements substantially exceed the base measurement value, a weld secondary issue in the welding cables may be identified by the controller and communicated to the user.

The illustrated method 104 further includes determining the voltage drop across the welding torch, time stamping such data, and storing the time stamped data to memory (blocks 116 and 118). As before, the initially acquired welding torch voltage drop may be utilized as a base point for future comparisons. The torch tip may be further shorted to the fixturing side of the rotary ground and the voltage may be sensed again (block 120). Subsequently, the sensed voltage may be utilized by the controller to determine, time stamp, and store a value for the voltage drop across the rotary ground (block 122), which may also be utilized as a base point for the comparison against future measurements that may be acquired.

The illustrated method 104 also includes shorting the torch tip to the fixturing and again sensing the voltage (block 124). The sensed voltage may then be utilized by the controller to determine, time stamp, and store a value for the voltage drop across the fixturing (block 126). The torch tip may then be shorted to the workpiece, at which point the voltage is again sensed (block 128), and a value for the voltage drop across the workpiece is determined, time stamped, and stored (block 130). Such values for the voltage drop across the fixturing and the voltage drop across the workpiece may be stored as base values for comparison to measurements acquired at a later point in time.

After the base voltage drop values have been established, for example, after the initial installation of the welding system, the welding system may be used for a predetermined use period before the welding system is retested (block 132). For example, some welding systems may be retested after a predetermined period of time. For instance, such welding systems may be tested monthly, quarterly, semi-annually, or any other suitable time period. For further example, some welding systems may be retested after a certain number of welds have been performed, regardless of the time that has elapsed since the prior testing. After acquisition of the data as before, the new measurements are compared to the previously acquired base measurements (block 134) and the user is alerted to any differences (block 136). Such a cycle may be repeated as desired to continually monitor the welding system for any possible weld secondary errors that may occur due to degradation over time or other factors. Of course, the system allows for testing at any time, such as when a noticeable degradation has occurred in the quality of welds or in the apparent performance of the welding system.

In certain embodiments, the system may be configured to communicate the results of the testing round as well as any comparisons to previously obtained data to the user via a variety of suitable mechanisms. For instance, the system may be configured to analyze the data and output a message to the user indicating that the computed differences are within or are outside a desired range. Still further, the system may be configured to generate graphs or charts illustrating the changes in the acquired measurements from the base value over time. Indeed, the systems disclosed herein may employ any suitable communication mechanisms to display and/or communicate the accumulated data to the user.

Figure 5:
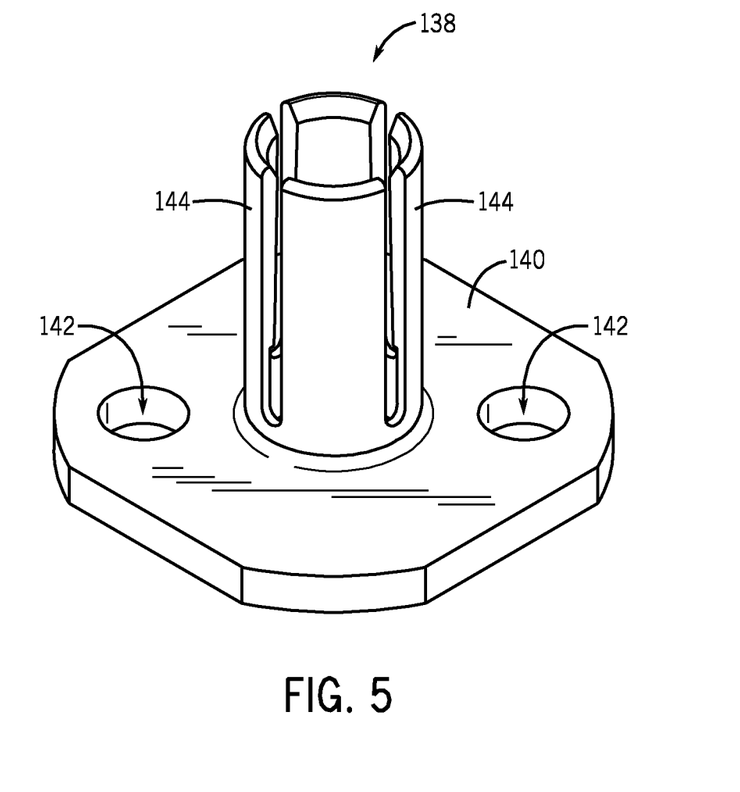
FIG. 5 is a perspective view illustrating an exemplary test contact that may be utilized with the welding system of FIG. 1 in accordance with embodiments of the present invention.

FIG. 5 illustrates an exemplary test contact 138 that may be positioned at any suitable location in the welding system 10 of FIG. 1 to establish and maintain good contact between a tip of the welding torch 16 and the measurement location (e.g., the workpiece, the fixturing, etc.). In the illustrated embodiment, the test contact 138 includes a base portion 140 with apertures 142 and projections 144. During use, the apertures may be utilized by the operator to secure the test contact 138 to the desired testing location via bolts, screws, and so forth. In some embodiments, the projections 144 are configured to interface with the contact tip of the welding torch, thus ensuring good contact between the welding torch and the desired measurement location. As such, the point of contact between the welding torch and the desired measurement location may remain consistent between measurements. In some embodiments, the foregoing feature may have the effect of reducing or eliminating variations in the torch voltage between measurements.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system comprising:
a weld secondary component; and
a processor configured to execute instructions stored in a tangible machine-readable memory medium, the instructions comprising instructions for:
determining a value of a weld secondary parameter across the weld secondary component based on a sensed parameter acquired via shorting of a welding torch tip to the weld secondary component;
comparing the determined value to a reference value range; and
alerting a user to a presence and location of a weld secondary error when the determined value is outside the reference value range.

2. The system of claim 1, wherein the instructions include instructions for receiving an input from the user regarding a negative weld lead length, and instructions for determining the reference value range based on the negative weld lead length.

3. The system of claim 1, wherein the instructions include instructions for receiving an input from the user regarding a negative weld lead size, and instructions for determining the reference value range based on the negative weld lead size.

4. The system of claim 1, further configured to receive an input from the user regarding a positive weld lead length, and to determine the reference value range based on the positive weld lead length.

5. The system of claim 1, wherein the instructions include instructions for receiving an input from the user regarding a positive weld lead size, and instructions for determining the reference value range based on the positive weld lead size.

6. The system of claim 1, wherein the instructions include instructions for receiving an input from the user regarding a welding torch manufacturer, and instructions for determining the reference value range based on the welding torch manufacturer.

7. The system of claim 1, wherein the instructions include instructions for receiving an input from the user regarding a welding torch model number, and instructions for determining the reference value range based on the welding torch model number.

8. The system of claim 1, wherein the instructions include instructions for receiving an input from the user regarding a welding torch length, and instructions for determining the reference value range based on the welding torch length.

9. The system of claim 1, wherein the reference range value is determined based on a measured value of an initial drop in the weld secondary parameter across the weld secondary component based on the sensed parameter at a prior time.

10. The system of claim 1, wherein the weld secondary parameter is at least one of a voltage, a current, a power, a resistance, a conductance, and an inductance.

11. The system of claim 1, wherein the weld secondary component is weld cabling.

12. The system of claim 1, wherein the weld secondary component is a welding torch.

13. The system of claim 1, wherein the weld secondary component is a rotary ground.

14. The system of claim 1, wherein the weld secondary component is weld fixturing.

15. The system of claim 1, wherein the weld secondary component is a welding workpiece.

16. The system of claim 1, wherein the instructions comprise instructions for storing the determined value of the weld secondary parameter to the tangible machine-readable memory medium.

17. A system comprising:
a weld secondary component; and
a processor configured to execute instructions stored in a tangible machine-readable memory medium, the instructions comprising instructions for:
determining a value of a weld secondary parameter across the weld secondary component based on a sensed parameter;
receiving an input via a user interface, wherein the input relates to a negative weld lead length, a negative weld lead size, a positive weld lead length, a positive weld lead size, a welding torch manufacturer, a welding torch model number, or a welding torch length;
determining a reference value range based on the received input;
comparing the determined value to the determined reference value range; and
alerting a user, via the user interface, to a presence and location of a weld secondary error when the determined value is outside the determined reference value range.

18. The system of claim 17, wherein the weld secondary parameter is at least one of a voltage, a current, a power, a resistance, a conductance, and an inductance.

19. The system of claim 17, wherein the weld secondary component is weld cabling, a welding torch, a rotary ground, weld fixturing, or a welding workpiece.

20. The system of claim 17, wherein the instructions comprise instructions for storing the determined value in the weld secondary parameter to a memory.

21. The system of claim 17, wherein the sensed parameter is acquired via shorting of a welding torch tip to the weld secondary component.

* * * * *